Jan. 18, 1955 A. M. VAN DIJK 2,699,861
CONVEYER FOR CONVEYING LOOSE MATERIAL
AS COAL IN COAL MINES
Filed Jan. 5, 1953 2 Sheets-Sheet 1

Inventor:-
Arend M. Van Dijk
By Cushman, Darby & Cushman
Attorneys

Jan. 18, 1955  A. M. VAN DIJK  2,699,861
CONVEYER FOR CONVEYING LOOSE MATERIAL
AS COAL IN COAL MINES
Filed Jan. 5, 1953  2 Sheets-Sheet 2

United States Patent Office 2,699,861
Patented Jan. 18, 1955

2,699,861

CONVEYER FOR CONVEYING LOOSE MATERIAL AS COAL IN COAL MINES

Arend M. Van Dijk, Terwinselen, Netherlands, assignor to Stamicarbon N. V., Heerlen, Netherlands Application January 5, 1953, Serial No. 329,582

3 Claims. (Cl. 198—184)

This invention relates to a conveyor for conveying loose material such as coal in coal mines. More particularly, the invention relates to a conveyor of the type comprising an endless belt which travels over idler rollers rotatable in bearings mounted on a supporting frame, which is built up of several sections, with longitudinal beams supported by terminal stools and connected thereto by means of cooperating studs and recesses on the respective parts.

A conveyor of this type is described in James Thomson patent, No. 2,551,513, issued May 1, 1951, and advantageously may be used for conveying coal in coal mines because the various parts constituting the supporting structure rapidly can be erected, extended or dismantled without use of tools.

According to prior construction the longitudinal beams rest without lateral restraint on the upper surface of the stools. On account of this the frame of the conveyor lacked the required rigidity in lateral directions so that angular deviations in the horizontal plane could occur. If the longitudinal beams are not kept in a direct line, the conveyor belt is incorrectly guided and suffers serious wear.

Another difficulty with prior structures has been that the upper surface of the stools on which the beams have rested is so small in the direction of beam length that unless the stools were placed in the correct position, the beams could slip from the upper surface of the stools.

An object of the invention is to provide a sectional supporting frame for an endless belt conveyor which is rigid in construction in a horizontal plane.

Another object of the invention is to provide a sectional supporting frame for an endless belt conveyor in which the conveyor belt will be guided in a straight line so that wear of the belt will be reduced to a minimum.

A further object of the invention is to improve the support of the beams in a vertical direction.

A still further object of the invention is to facilitate storage and transport of the stools.

With these and other objects in view the invention is hereinafter described with reference to the accompanying drawings, in which Fig. 1 is an elevation of a section of a belt conveyor, with portions of its length omitted;

Figure 1:
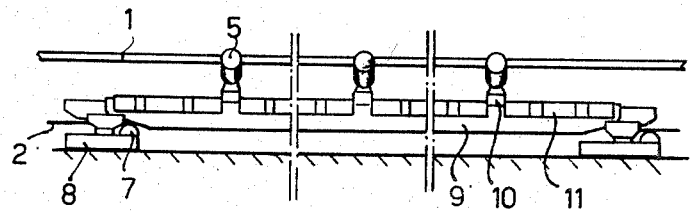
Figure 2:
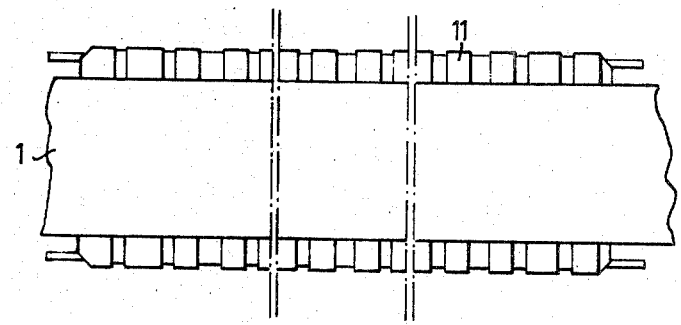
Fig. 2 is a corresponding plan view.
Figure 3:
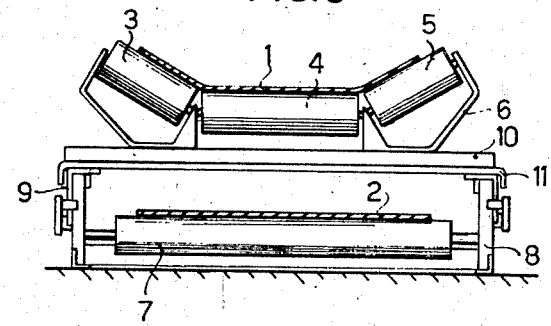
Fig. 3 is an end view of the conveyor.

Referring to the drawings in which like parts are indicated by like references, the conveyor comprises an endless belt, the upper run 1 of which travels over sets of three idler rollers 3, 4 and 5 which are rotatable in bearing brackets 6. Each set of these rollers is arranged in such a manner as to keep the belt in a troughlike shape as shown in Figure 3. The lower run 2 of the belt travels over single idler-rollers 7 supported in the standards or stools 8.

The supporting structure of the conveyor is composed of a plurality of sections, each section comprising a stool 8, a pair of spaced longitudinals 9, a number of idler boards 10 and cover plates 11.

The stools 8 are provided with two ends for supporting two parallel longitudinals or beams 9, each end being provided with a base 12 by which the stool rests on the floor ground surface, or on concrete blocks, and with a supporting bar 13 on which the beams 9 rest. The base 12 and the supporting bar 13 are interconnected by means of a vertical standard 14 of suitable length. The two ends of each stool are connected by a cross bar 15.

The length of each supporting bar 13 corresponds to that of its base 12. As a result of this the danger of the beams 9 slipping off the stools 8 is very slight. Moreover, storage is facilitated because the stools 8 easily can be stacked in a warehouse and during transport can be joined into orderly groups.

The stools are provided with coupling plates 16, which are fixed to the standards 14 by means of uprights 17. The coupling plates 16 may be welded to the uprights 17, but if desired they may be pivotally connected thereto. On their surfaces facing the standards 14 the coupling plates 16 are provided with studs 18 for making connection with the beams 9.

Figure 4:
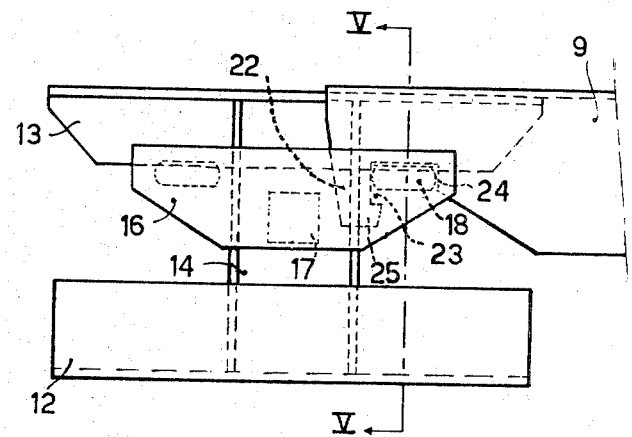
Fig. 4 is an elevation on a larger scale of a stool with attached beam.
Figure 5:
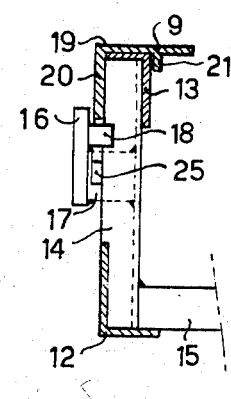
Fig. 5 is a section on the line V—V in Figure 4.

The beams 9 are right-angled in cross-section with a horizontal flange 19 and a downwardly extending vertical flange 20. As shown in Figure 5, a shoulder or ridge 21 projects downwardly from the horizontal flange 20, shoulder 21 being spaced from vertical flange 20 by a distance corresponding to the width of supporting bar 13. Hence, with the beams 9 positioned as shown in Figure 5, the line of beams will be centered by the stools and always will be in perfect linear alignment. As also shown in Figure 5, the ends of the vertical flange 20 of each beam are provided with a downwardly extending projection 22 so that a downwardly facing recess 23 is formed at the ends of those flanges. With the elements connected as shown in Figures 4 and 5, each pin thus will be enclosed in a horizontal sense between a downwardly extending projection 22 and the opposed end face 24 of the beam flange recess, so that the movement of the beam 9 in a longitudinal direction is restricted. Each projection 22 is provided with a hooklike member 25 to extend beneath the stud 18, so that movement of the beams 9 in a vertical direction will be prevented except to a limited extent.

In assembling the conveyor, the stools 8 or the beams 9 are held in an oblique position so that the stud 18 may enter the slot between the hook 25 and the end face 24, whereafter the longitudinals are turned until the pins 18 properly fit in the recesses 23. At this time the supporting beam 13 will become enclosed between shoulder 21 and flange 20.

The conveyor construction described can be erected to any desired length without the use of tools by assembling the required number of sections end to end, after which the beams and thus the conveyor belt supported thereby lie in a perfect alignment, so that wear of the belt will be reduced to a minimum. Also the movement of the beams 9 in vertical and horizontal directions is prevented except to a limited extent, so that the beams 9 and the stools 8 cannot come loose of their own accord when coupled.

The terminology used in the specification is for the purpose of description and not of limitation, the scope of the invention being defined in the claims.

I claim:

1. In a conveyor structure, a stool element, a beam element and means to connect said elements comprising a horizontal stud on one element and a recess on the other element, said stud and said recess being so disposed as to limit movement of said elements in vertical and longitudinal directions, said beam element including a pair of longitudinally extending vertical shoulders spaced apart and said stool element including an upper horizontal bar member extending longitudinally, said bar member being of substantial length to thereby extend a substantial distance beneath two adjoining beam elements resting thereon and having vertical faces closely engaged by said vertical shoulders of each of said beams.

2. A conveyor structure of the character described in claim 1 wherein said beam element is right-angled in transverse section to include a horizontal flange and a vertical flange, so that the vertical flange forms one of said shoulders, and the horizontal flange includes a downward projection to form the other shoulder.

3. A conveyor structure of the character described in claim 1 wherein said stool element includes a lower base member extending longitudinally beneath said upper bar member, said base member and said upper bar member being of corresponding length.

References Cited in the file of this patent

UNITED STATES PATENTS

| | | |
|---|---|---|
| 1,770,007 | Nyborg et al. | July 8, 1930 |
| 2,105,889 | Madeira | Jan. 18, 1938 |
| 2,147,908 | Madeira | Feb. 21, 1939 |